C. B. GRACEY.
COUPLING.
APPLICATION FILED FEB. 11, 1911.
1,013,598. Patented Jan. 2, 1912.
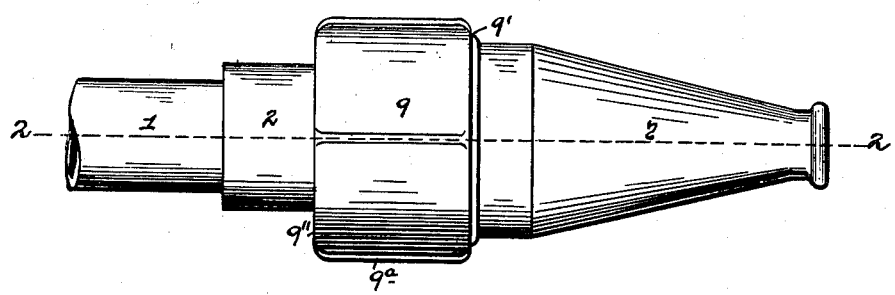
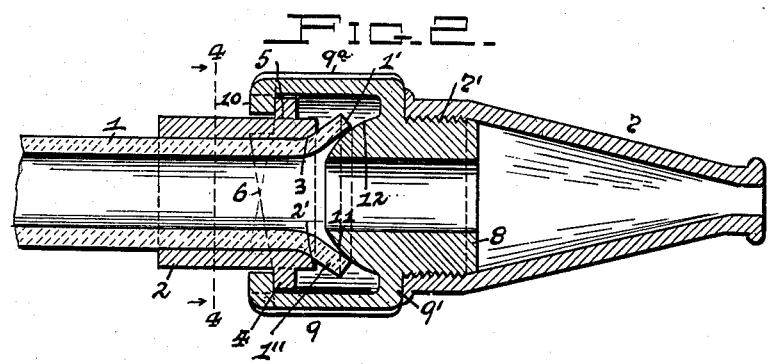
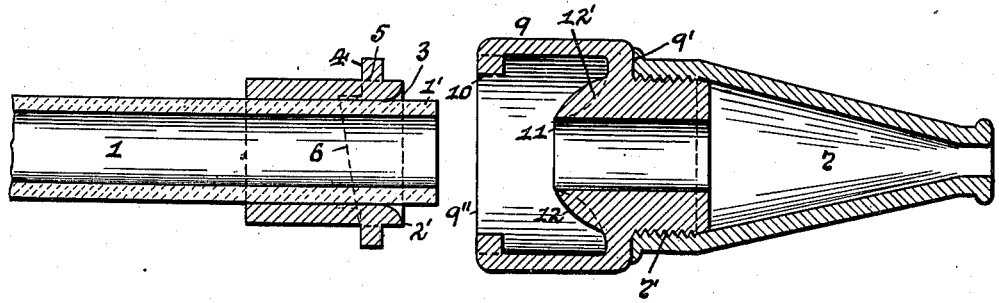
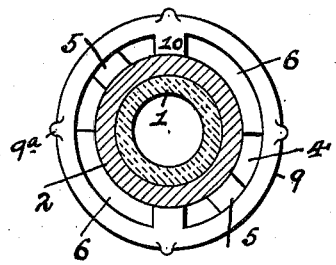
Witnesses:
Inventor:
Charles B. Gracey.
By J. H. Cooke,
Attorney.

UNITED STATES PATENT OFFICE.

CHARLES B. GRACEY, OF CORAOPOLIS, PENNSYLVANIA.

COUPLING.

1,013,598.
Specification of Letters Patent.
Patented Jan. 2, 1912.

Application filed February 11, 1911. Serial No. 608,140.

*To all whom it may concern:*

Be it known that I, CHARLES B. GRACEY, a resident of Coraopolis, in the county of Allegheny and State of Pennsylvania, have invented a new and useful Improvement in Couplings; and I do hereby declare the following to be a full, clear, and exact description thereof.

My invention relates to couplings, and has special reference to such a form of a coupling, which is especially adapted for use in connection with the coupling of hose, lead pipe and other pipes capable of being spread at their ends.

The object of my invention is to provide a cheap, simple and efficient coupling which will do away with the usual washers generally employed in such couplings, will enable a tight joint to be formed by the end of the pipe employed, and will also enable a smooth bore connection to be formed thereby, as well as such a device which can be easily and quickly coupled and uncoupled when desired.

To these ends my invention consists, generally stated, in the novel arrangement, construction and combination of parts, as hereinafter more specifically set forth and described and particularly pointed out in the claims.

To enable others skilled in the art to which my invention appertains to construct and use my improved coupling, I will describe the same more fully, referring to the accompanying drawing, in which—

Figure 1 is a side elevation of my improved coupling in operating position. Fig. 2 is a longitudinal central section of the same on the line 2—2, Fig. 1. Fig. 3 is a like view showing the parts in position for coupling. Fig. 4 is a cross-section of the coupling on the line 4—4, Fig. 2, looking in the direction of the arrows.

Like symbols of reference herein indicate like parts in each of the figures of the drawing.

As illustrated in the drawing, 1 represents the end portion of a hose and 2 is a sleeve which is placed over and around such end portion of the hose, and such sleeve is positioned on said hose, so that the end edge 1′ of the hose projects through the inner or engaging end 2′ of said sleeve, as shown in Fig. 3. The end 2′ of the sleeve 2 has its inner surface flared outwardly, as at 3, and in the rear of said end and extending outwardly from the outer surface of said sleeve is the annular flange 4, which is provided with two slots 5 within the same, while between each of said slots and on the outer face of said flange is an inclined or tapered face 6. The nozzle 7 is adapted to be connected to and around a boss or an extension 8 extending out from a shouldered end 9′ of a one-piece coupling or collar 9 by a threaded connection 7′ whose threads extend to said shoulder 9′, and the other end 9″ of said collar has two lugs 10 extending inwardly from the same, while between said boss and said lugs and extending inwardly from said end 9′ into the chamber 11′ of the coupling or collar is the projection 11 which is provided with the outwardly and backwardly tapered outer face 12 extending from the outer end of the same.

In the use of my improved hose coupling, the sleeve 2 is placed over and along the end portion 1 of the hose, so that the end edge 1′ of such hose projects through said sleeve end 2′ as shown in Fig. 3, and then the coupling or collar 9 is placed over said ends 1′ and 2′ and connected to said sleeve by passing the lugs 10 on said collar through the slots 5 in the flange 4 on said sleeve, which will allow the tapered face 12 on the collar projection 11 to engage with the hose end 1′ and turn out the same into the chamber 11′ so that it forms the flared end 1″ between said face and the flared face 3 on the sleeve 2. After the lugs 10 have been so passed through the slots 5, the collar 9 is turned, so that said lugs will ride up the tapered or inclined faces 6 on the sleeve flange 4 and between said slots, which will act to flare the end 1″ of the hose 1 to a greater extent and more firmly bind the same between the flared surfaces 3 and 12 on the sleeve 2 and collar 9, respectively.

It will be evident that the coupling or collar 9 can be connected to the sleeve 2 with or without the nozzle 7 connected to the same, and that other connections can be made to said collar, if desired, while lead pipe and other pipe capable of binding or spreading at the ends of the same can be employed with the coupling, and if desired the tapered face 12 on the coupling can be dished, as shown by dotted lines at 12′ in Fig. 3, in order to allow the spreaded end of the hose or pipe to fit in the same when in position. The coupling or collar 9 can be provided with ribs 9ᵃ on its outer face for the use of a wrench in tightening up the same, and if desired, the collar can be attached to any ordinary hydrant for use in fires, etc., and the usual spanner used in tightening up said collar.

Various other modifications and changes in the design and construction of my improved coupling may be resorted to, without departing from the spirit of the invention or sacrificing any of its advantages.

It will thus be seen that my improved coupling can be easily and rapidly assembled or disconnected when desired, and in case of wear on the end of the hose acting as a washer between the collar and sleeve connection, the edge of the same can be trimmed, while it also will be seen that the connection will not interfere in any way with the full bore passage of water through and from the base by no interference through the connection and the hose will be enabled to form a tight and non-leakage joint between the connecting parts.

What I claim as my invention and desire to secure by Letters Patent is—

1. A one-piece coupling comprising a chamber, a tapered portion projecting into the chamber and adapted to receive the flared end of a pliable pipe, and an exteriorly threaded extension outside of said chamber and continued from the tapered portion, said tapered portion and extension having a uniform bore.

2. A one-piece coupling comprising a chamber, a tapered portion projecting into the chamber and adapted to receive the flared end of a pliable pipe, an exteriorly threaded extension outside of said chamber and continued from the tapered portion, a shoulder formed by said chamber, and the threads on said extension extending to the shoulder for the pipe to abut against, said tapered portion and extension having a uniform bore.

3. In a hose coupling, the combination with the end of a pliable pipe, of a sleeve fitting over and around said end to form a projecting portion by such end, an outwardly extending flange on said sleeve having slots therein and inclined faces thereon, a collar fitting over said flange and having an integral tapered face fitting in said end, and lugs on said collar for engaging with said flange by being passed through said slots to confine said end between said tapered face and said sleeve.

In testimony whereof, I, the said CHARLES B. GRACEY, have hereunto set my hand.

CHARLES B. GRACEY.

Witnesses:
T. B. HUMPHRIES,
J. N. COOKE.